Patented Feb. 12, 1929.

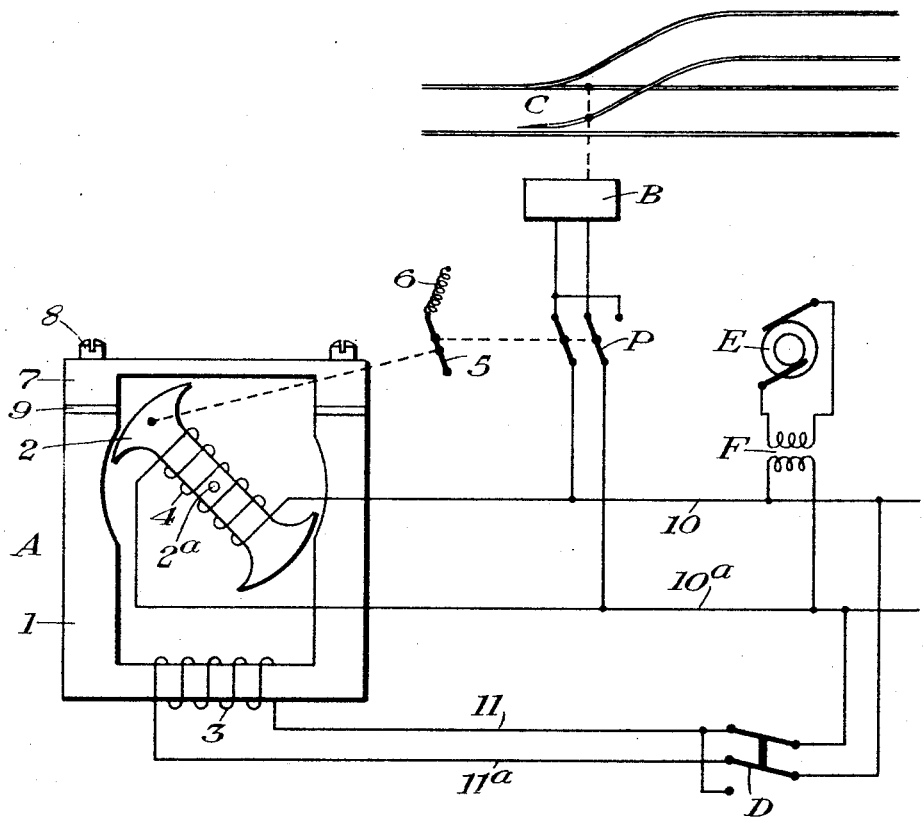

1,702,049

UNITED STATES PATENT OFFICE.

ROBERT M. GILSON, OF PITTSBURGH, PENNSYLVANIA, AND ALFRED B. MILLER, OF ETOWAH, TENNESSEE, ASSIGNORS TO THE UNION SWITCH & SIGNAL COMPANY, OF SWISSVALE, PENNSYLVANIA, A CORPORATION OF PENNSYLVANIA.

RAILWAY-SWITCH CONTROLLER.

Application filed April 23, 1925. Serial No. 25,271.

Our invention relates to railway switch controllers, that is, to controllers which are governed from a central point, such as an interlocking tower, and serve in turn to govern the positions of railway switches.

One object of our invention is the provision of means for preventing false operation of a switch circuit controller in the event that a short circuit occurs in one of the windings of the circuit controller.

We will describe one form of circuit controller embodying our invention, and will then point out the novel features thereof in the claim.

The accompanying drawing is a view, partly diagrammatic, showing one form of circuit controller embodying our invention.

Referring to the drawing, the reference character A designates a switch circuit controller comprising a field member 1, and an armature member 2 pivotally mounted at 2ª. The field member 1 is provided with a winding 3, and the armature member 2 is provided with a winding 4. The armature winding 4 is constantly supplied with alternating current by a pair of wires 10 and 10ª, which in turn are furnished with alternating current from a generator E through a transformer F. The field winding 3 of the circuit controller A is supplied with alternating current of one polarity or the other, relative to the current in the armature winding from the wires 10 and 10ª, through the medium of a pole-changer D, and wires 11 and 11ª. The pole-changer D will usually be part of a lever in an interlocking machine.

When pole-changer D is in one position, the armature 2 will occupy the position in which it is shown in the drawing, whereas, when the pole-changer D is reversed, the armature 2 will be swung in clockwise direction to the position opposite to that from which it is shown in the drawing.

The armature 2 controls a pole-changer P through the medium of a toggle device, comprising an arm 5 and a spring 6. When the armature 2 is reversed, it swings the arm 5 in clockwise direction, thereby compressing the spring 6 until the arm 5 moves beyond its middle position, whereupon the movement of the parts is completed with a snap action due to the force exerted by the spring 6. The pole-changer P controls the relative polarity of the alternating current supplied to a switch operating mechanism B, which mechanism in turn actuates a railway switch C.

With the structure thus far described, if a short circuit occurs in either the field winding 3 or the armature winding 4, the reaction between the armature and the field will tend to place the armature in its intermediate position, and the movement of the armature to this position may take place with sufficient force to throw the toggle device 5—6 beyond its dead center, in which event the pole-changer P will be reversed, and so the switch C will be reversed without a corresponding movement of the pole-changer D. We have found that this operation, in the event of a short circuit, may be prevented by a leakage block 7 of magnetizable material connecting the pole-pieces of the field member 1. This leakage block 7 is attached to the pole-pieces by screws 8, and is separated from the pole-pieces by an air gap formed of suitable spacers 9, the thickness of which may be varied to secure proper reluctance of the leakage path. In the event of a short circuit in the field winding 3, the leakage block 7 causes most of the flux generated by the armature winding 4 to traverse the leakage path, thereby reducing armature reactance and so preventing improper reversal of the position of the armature. Similarly, in the event of a short circuit in the armature winding 4, most of the field flux is forced through the leakage path 7, so that insufficient torque is developed to reverse the position of the armature 2.

The operation referred to above will be more clearly understood from the following discussion.

Assuming that the armature and field windings are intact, that the armature is in one of its extreme positions, and that the instantaneous relative polarity of the current in the field winding is reversed, the armature will rotate toward its other extreme position. The reason for this is, that the armature tends to assume a position wherein the flux produced by its winding will be in phase with, and in the same direction as, the flux produced by the current in the field winding. The torque on the armature under these conditions is maximum when the axial center line of the armature winding is at right angles to the horizontal center line between the field pole faces, and the torque would be zero if the axial center line of the armature coil could coincide with the horizontal center line between the field pole faces.

We will now assume that a short circuit occurs in the armature winding. The armature coil then becomes a freely suspended closed coil in an alternating magnetic field, and so the armature tends to move to such position that none of the field flux is linked by the armature turns. If the armature had no inertia it would move to the center position wherein the axial center line of the armature coil is at right angles to the horizontal center line between the field pole faces, and would stop in this position. Since the toggle mechanism 5 would not be reversed by this action of the armature an improper reversal of pole-changer P would not occur. In actual practice, however, the armature has sufficient inertia, due to its mass, to swing past this central position and so to cause an improper reversal of the toggle mechanism and pole-changer.

From the foregoing it will be seen that in normal operation with both windings of the circuit controller energized, the maximum torque occurs just as the armature passes through its central position, that is, at just about the time that the toggle mechanism is reversed, whereas when a short circuit occurs in the armature, the armature has zero driving torque in the central position, and it is the inertia of the armature which reverses the toggle mechanism. With these points in mind, it is evident that if the speed with which the armature is forced toward the central position under short circuit conditions is reduced, the inertia of the armature will be insufficient to carry it past the central position with a force great enough to reverse the toggle mechanism and pole-changer. Since the force driving the short-circuited armature is roughly proportional to the flux from the field winding which passes through the armature winding, the leakage block, because it by-passes some of the field flux, reduces the force with which the armature is driven towards the central position, and so the inertia of the armature is not sufficient to cause reversal of the toggle mechanism and pole-changer.

In the event of a short circuit in the field winding, the operation and results are substantially the same. That is to say, the circuit controller attempts to place itself in such condition that none of the flux created by the current in the armature winding passes through the field winding, and since the armature is the only part which can move, it swings to its central position wherein the axial line of the armature coil is at right angles to the center line through the field pole faces. The leakage block by-passes some of the flux and thereby reduces the force with which the armature is driven toward the central position, so that the inertia of the armature is not sufficient to cause reversal of the toggle mechanism and pole changer.

The leakage block is susceptible of accurate adjustment by means of the spacers 9, and so it can easily be arranged to give protection against improper operation of the circuit controller due to short circuit conditions regardless of variations in the physical construction of the circuit controller.

Although we have herein shown and described only one form of switch circuit controller embodying our invention, it is understood that various changes and modifications may be made therein within the scope of the appended claim without departing from the spirit and scope of our invention.

Having thus described our invention, what we claim is:

A railway switch circuit controller comprising a U-shaped field member, an armature member pivotally mounted at an intermediate point between the pole pieces of said field member, a winding on each member whereby said armature member swings to one extreme position or the other according as one winding is supplied with current of one polarity or the other relative to the current in the other winding, and a leakage block of magnetizable material connecting the pole-pieces of said field member to prevent said armature member from assuming an intermediate position in the event of a short circuit in either winding.

In testimony whereof we affix our signatures.

ROBERT M. GILSON.
ALFRED B. MILLER.